United States Patent
Todd et al.

(10) Patent No.: US 6,757,975 B1
(45) Date of Patent: Jul. 6, 2004

(54) MULTI-LAYERED COMPLIANT MECHANISMS AND METHOD OF MANUFACTURE

(75) Inventors: Robert H. Todd, Provo, UT (US);
Larry L. Howell, Orem, UT (US);
Spencer P. Magleby, Provo, UT (US);
Aaron L. Herring, Tucson, AZ (US)

(73) Assignee: Brigham Young University, Provo, UT (US)

( * ) Notice: Subject to any disclaimer, the term of this patent is extended or adjusted under 35 U.S.C. 154(b) by 0 days.

(21) Appl. No.: 10/057,758

(22) Filed: Jan. 24, 2002

Related U.S. Application Data
(60) Provisional application No. 60/264,204, filed on Jan. 25, 2001.

(51) Int. Cl.⁷ .......................... B21D 53/28; F16D 11/00
(52) U.S. Cl. ........................ 29/893.33; 29/893; 29/434; 192/105 CD; 192/107 T; 192/108
(58) Field of Search .................. 29/893.33, 893.35, 29/596, 609, 434, 598, 597, 893, 893.1, 893.2, 893.36, 435; 192/46, 108, 105 CD, 107 T, 206; 188/82.7; 310/216

(56) References Cited

U.S. PATENT DOCUMENTS

| | | | |
|---|---|---|---|
| 3,171,283 A | 3/1965 | Giometti | |
| 3,264,884 A | 8/1966 | Brooker | |
| 3,289,877 A | 12/1966 | Wolf | |
| 3,403,237 A | 9/1968 | Wysong | |
| 3,486,597 A | 12/1969 | Carlton | |
| 3,512,227 A | 5/1970 | Krawagna | |
| 3,582,584 A | 6/1971 | Best | |
| 3,582,594 A | 6/1971 | Twyford | |
| 3,589,486 A * | 6/1971 | Kelch .......................... | 192/46 |
| 3,594,852 A | 7/1971 | Krawagna | |
| 3,668,356 A | 6/1972 | Kekas | |
| 3,720,979 A | 3/1973 | Krawagna | |
| 3,742,171 A | 6/1973 | Howe | |
| 3,910,557 A | 10/1975 | Merriman | |
| 3,982,616 A | 9/1976 | Bidanset | |
| 4,016,964 A * | 4/1977 | Dietzsch et al. ...... | 192/105 CD |
| 4,046,240 A | 9/1977 | Schlagmuller et al. | |
| 4,054,766 A | 10/1977 | Kramer | |
| 4,106,356 A | 8/1978 | Nagano et al. | |
| 4,125,074 A | 11/1978 | Sato | |
| 4,253,495 A | 3/1981 | Mon | |
| 4,332,991 A | 6/1982 | Nordstrom | |
| 4,401,006 A | 8/1983 | Sekiguchi | |
| 4,530,678 A | 7/1985 | Wechsler | |
| 4,570,769 A * | 2/1986 | Isaka .......................... | 192/46 |
| 4,637,809 A | 1/1987 | Nagano | |
| 4,699,605 A | 10/1987 | Jona | |
| 4,824,420 A | 4/1989 | Romano | |

(List continued on next page.)

OTHER PUBLICATIONS

Proceedings of DETC'00, ASME Design Engineering Technical Conferences, Baltimore, MD Sep. 10–13, 2000.
WO 00/12377 PCT International Publication Dated Mar. 9, 2000.

Primary Examiner—Peter Vo
Assistant Examiner—Stephen Kenny
(74) Attorney, Agent, or Firm—Thorpe North & Western

(57) ABSTRACT

A compliant mechanism and method of manufacturing the same includes a plurality of layers formed from stamping a plurality of layers from a layer of thinner material and stacking the layers together. Compliant mechanisms can include clutches, switches, derailleurs, brakes and other mechanisms. The compliant mechanism includes rigid and flexible sections of integral construction. The rigid and flexible sections provide an integral device capable of achieving motion by elastic deformation. The flexible section is deflectable, and stores energy in the form of strain energy when deflected.

15 Claims, 5 Drawing Sheets

U.S. PATENT DOCUMENTS

| | | |
|---|---|---|
| 4,860,740 A | 8/1989 | Kirk et al. |
| 4,878,395 A | 11/1989 | Romano |
| 4,887,482 A | 12/1989 | Romano |
| 5,000,721 A | 3/1991 | Williams |
| 5,006,681 A | 4/1991 | Postmus et al. |
| 5,016,807 A | 5/1991 | Haack |
| 5,088,581 A | 2/1992 | Duve |
| 5,143,189 A | 9/1992 | Meier-Burkamp |
| 5,165,509 A * | 11/1992 | Kanno et al. .................. 192/44 |
| 5,205,386 A | 4/1993 | Goodman et al. |
| 5,246,094 A | 9/1993 | Army et al. |
| 5,257,685 A | 11/1993 | Tichiaz et al. |
| 5,285,039 A | 2/1994 | Satoh |
| 5,362,293 A | 11/1994 | Romanauskas |
| 5,425,678 A | 6/1995 | Richardson |
| 5,449,057 A | 9/1995 | Frank |
| 5,495,080 A | 2/1996 | Periou et al. |
| 5,495,920 A | 3/1996 | Tsuyoshi |
| 5,522,489 A | 6/1996 | Savkar et al. |
| 5,577,586 A | 11/1996 | Buckendahl |
| 5,636,716 A | 6/1997 | Sugimoto et al. |
| 5,649,454 A | 7/1997 | Midha et al. |
| 5,655,630 A | 8/1997 | Sugimoto |
| 5,678,668 A | 10/1997 | Sink |
| 5,690,202 A * | 11/1997 | Myers ......................... 192/46 |
| 5,775,466 A | 7/1998 | Banyas et al. |
| 5,836,844 A | 11/1998 | Yoshida |
| 5,853,073 A | 12/1998 | Costin |
| 5,897,451 A | 4/1999 | Ichida |
| 5,913,387 A | 6/1999 | Yamashita et al. |
| 6,046,659 A | 4/2000 | Loo et al. |
| 6,109,397 A | 8/2000 | Chen |
| 6,148,979 A * | 11/2000 | Roach et al. .............. 192/45.1 |
| 6,215,081 B1 | 4/2001 | Jensen et al. |
| 6,250,449 B1 * | 6/2001 | Haussner ............. 192/105 CD |
| 6,253,896 B1 * | 7/2001 | Notaras et al. ....... 192/105 CD |
| 6,575,279 B2 * | 6/2003 | Quigley ...................... 192/46 |

\* cited by examiner

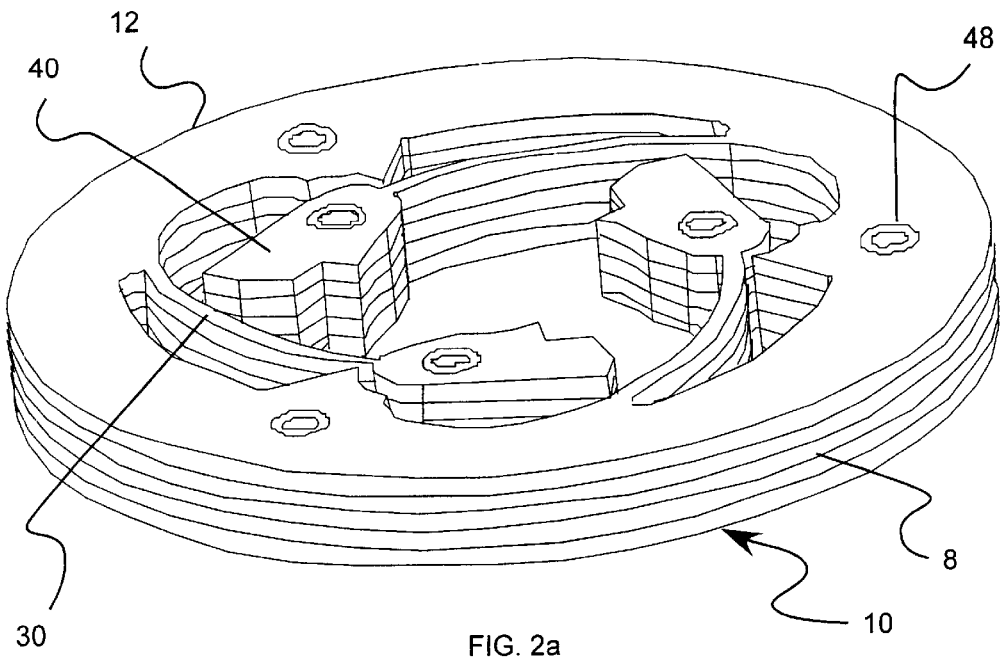
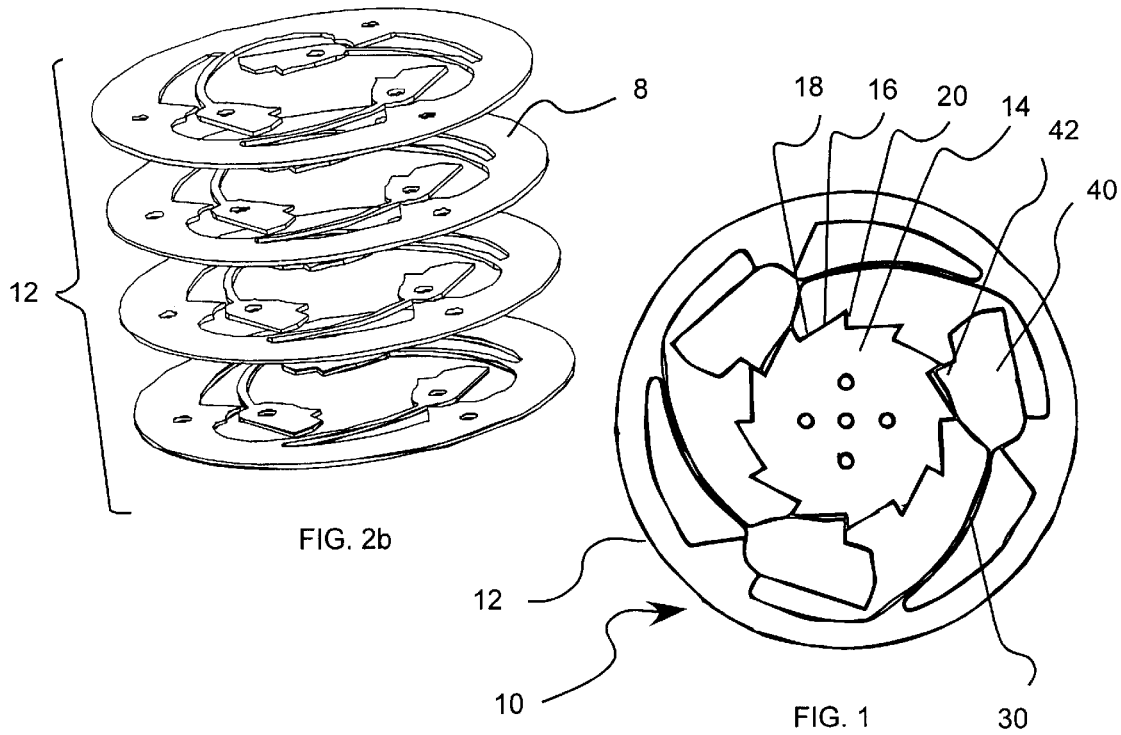
FIG. 2a
FIG. 2b
FIG. 1

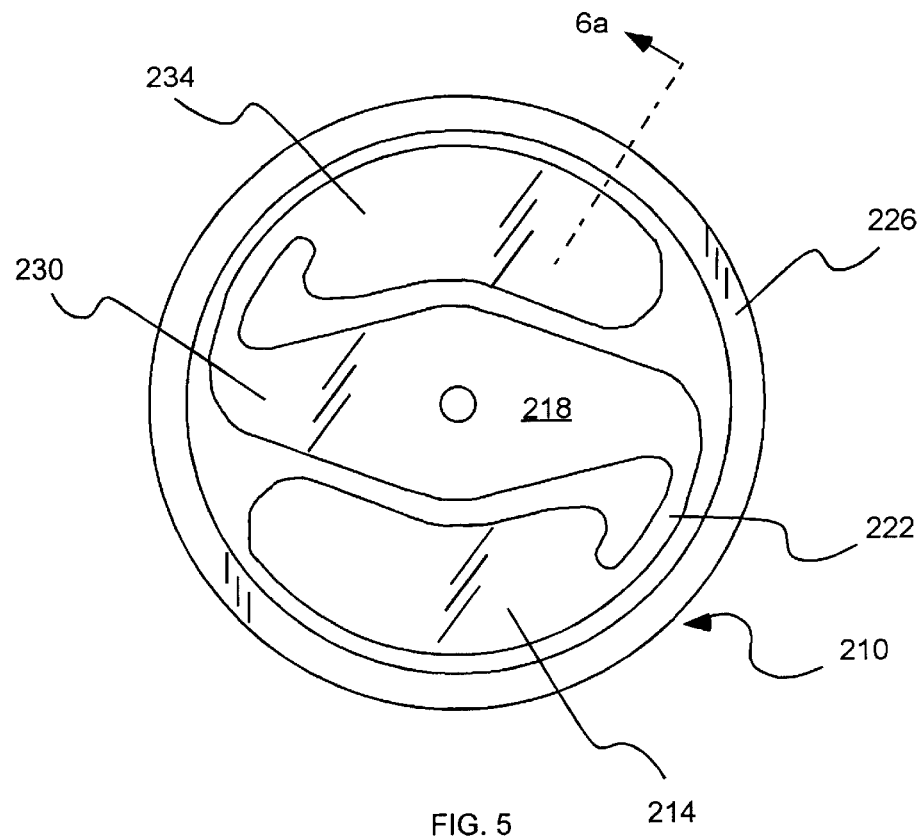
FIG. 5
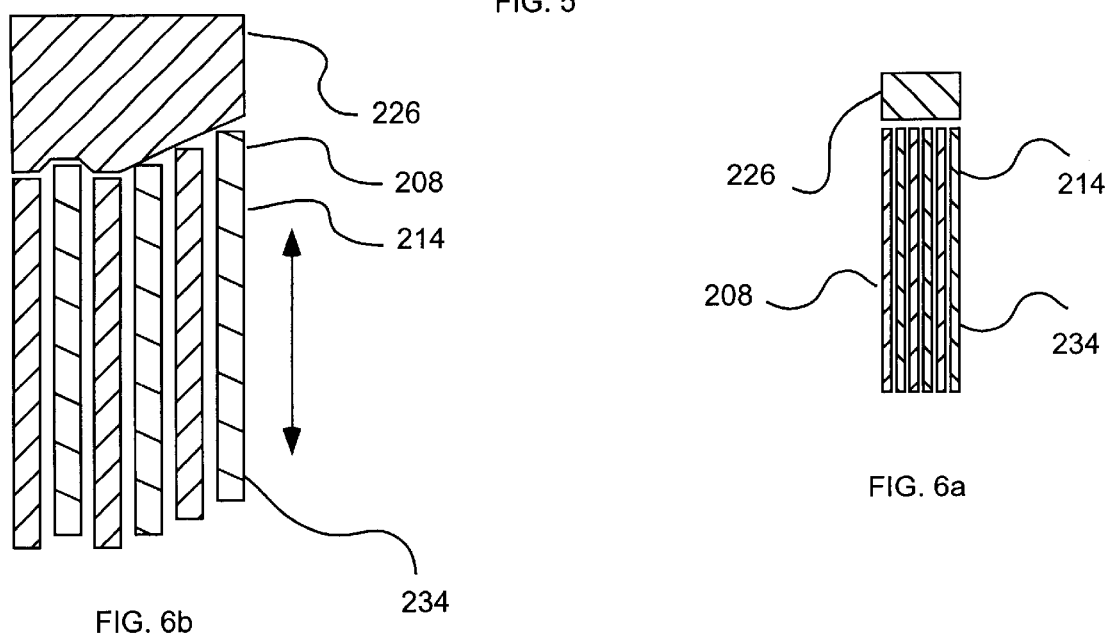
FIG. 6b
FIG. 6a

MULTI-LAYERED COMPLIANT MECHANISMS AND METHOD OF MANUFACTURE

This application claims the benefit of U.S. Provisional Application No. 60/264,204, filed Jan. 25, 2001.

BACKGROUND OF THE INVENTION

1. Field of the Invention

The present invention relates generally to compliant mechanisms and methods of manufacturing such compliant mechanisms. More particularly, the present invention relates to multi-layered compliant mechanisms and methods of manufacturing the same.

2. Related Art

Compliant mechanisms have been developed for a variety of applications, including clutches, switches, bicycle derailleurs, and bicycle brakes. Compliant mechanisms typically include a flexible section that is allowed to bend, or moves through elastic deformation. The flexible section of the compliant mechanism can replace a pivot joint, such as a pivot pin, in the replaced device. A number of advantages are realized by compliant mechanisms, including cost reduction and increased performance. For example, compliant mechanisms can reduce the number of parts for an application or device, reduce the assembly time of such devices, and simplify the manufacturing process, thus reducing the costs associated with multiple parts. As another example, compliant mechanisms can increase precision, increase reliability, reduce wear, reduce weight, and reduce maintenance.

Although many advantages have been realized with compliant mechanisms, some disadvantages have been discovered. For example, it has been found to be difficult and/or expensive to manufacture some types or configurations of compliant mechanisms. It will be appreciated that compliant mechanisms often require tight tolerances that are difficult or expensive to manufacture. In addition, it will be appreciated that some compliant mechanisms include long, thin, flexible members with shapes designed for controlled deformation and force. The required precision and geometries contemplated are beyond what can be achieved with common casting or forging techniques. Machining and electric discharge machining (EDM) have been found to meet the requirements for tolerances, but can be overly expensive, especially when one of the goals of compliant mechanisms is to reduce the costs of a device. In addition, machining and EDM fail to meet volume and speed requirements. Stamping has been found to meet the requirement for being less-expensive, but often fails to meet tolerance requirements, thus detrimentally affecting the performance of the device.

As an example, clutches have been developed that utilize a compliant mechanism for the clutch shoe or pawl wheel. The compliant mechanism can include a rigid section or mass coupled to a flexible arm. As the clutch rotates, the rigid section or mass is caused to move outwardly by centrifugal force, either engaging or disengaging depending on the type of clutch. In addition, the flexible arm is caused to elastically deflect due to movement of the rigid section or mass. As the rotation of the clutch decreases, the strain energy stored in the flexible arm causes the rigid section or mass to move back inwardly, again disengaging or engaging depending on the type of clutch. It will be appreciated that in a compliant clutch, the flexible arm can be long and thin. In addition, it will be appreciated that the flexible arm and mass must be made to precise specifications or the operation of the clutch will be affected. For example, the thickness of the flexible arm can affect the deflection characteristics of the arm, the movement of the mass, and thus the engagement and disengagement of the clutch.

SUMMARY OF THE INVENTION

It has been recognized that it would be advantageous to develop compliant mechanisms that are easier and/or less expensive to manufacture, while maintaining the required tolerances, and thus retaining performance. In addition, it has been recognized that it would be advantageous to develop a method of manufacturing compliant mechanisms that is easier and/or less expensive, while maintaining tolerances.

The invention provides compliant mechanisms with rigid and flexible sections of integral construction. The rigid and flexible sections advantageously include a plurality of common layers stacked together. The plurality of common layers can be formed by cutting a layer of material with a thickness less than a thickness of the mechanism. The thinner layers can be quickly cut, and can be cut within the required tolerances. The rigid and flexible sections provide an integral device capable of achieving motion by elastic deformation. The flexible section is deflectable, and stores energy in the form of strain energy when deflected. The flexible section can be deflectable wholly within a plane that is parallel with the plurality of layers. Similarly, the rigid section can be movable within a plane that is parallel with the plurality of layers.

In accordance with a more detailed aspect of the present invention, the plurality of layers can each include a free portion. The free portions of the plurality of layers can be substantially unattached to free portions of adjacent layers. Thus, the free portions of the plurality of layers can be unattached and independently movable with respect to one another. For example, a clutch shoe can be formed by the rigid section, and by layers that are unattached so that the layers forming the clutch shoe can move independently with respect to one another.

Alternatively, in accordance with another more detailed aspect of the present invention, the plurality of layers can be laminated or joined together.

In accordance with another more detailed aspect of the present invention, the compliant mechanism can be a compliant overrunning clutch with centrifugal throw-out. The clutch can include a ratchet wheel and a pawl wheel rotatable with respect to one another. Ratchet teeth can be disposed on the ratchet wheel, while pawls can be coupled to the pawl wheel and engagable with the ratchet teeth. Biasing members can couple the pawl to the pawl wheel, and can bias the pawl into engagement with the ratchet tooth. The pawl can be formed by the rigid section, while the biasing member can be formed by the flexible section. Again, the plurality of layers allows the biasing member to be formed with the desired tolerances.

In accordance with another more detailed aspect of the present invention, the compliant mechanism can be a compliant floating-opposing-arm (FOA) centrifugal clutch or an s-clutch. The clutch can include a clutch shoe and drum rotatable with respect to one another. The clutch shoe can be formed at least partially by the flexible and rigid sections. The rigid section can move and the flexible section can deflect during rotation to engage an engagement surface of the drum. In addition, the plurality of layers of the clutch shoe can each include a free portion. The free portions of the plurality of layers are substantially unattached to free portions of adjacent layers of the clutch shoe. Thus, the free portions of the plurality of layers of the clutch shoe are independently movable with respect to one another.

It is of course understood that other types of compliant mechanisms can be formed in accordance with the present invention.

Additional features and advantages of the invention will be apparent from the detailed description which follows, taken in conjunction with the accompanying drawings, which together illustrate, by way of example, features of the invention.

BRIEF DESCRIPTION OF THE DRAWINGS

FIG. 1 is a front view of a compliant clutch in accordance with an embodiment of the present invention;

FIG. 2a is a perspective view of a pawl wheel of the compliant clutch of FIG. 1;

FIG. 2b is an exploded view of the pawl wheel of FIG. 2a;

FIG. 5 is a front view of another compliant clutch in accordance with an embodiment of the present invention;

FIG. 6a is a cross-sectional side view of the compliant clutch of FIG. 5;

FIG. 6b is a detailed cross-sectional side view of the compliant clutch of FIG. 5;

DETAILED DESCRIPTION

Figure 3:
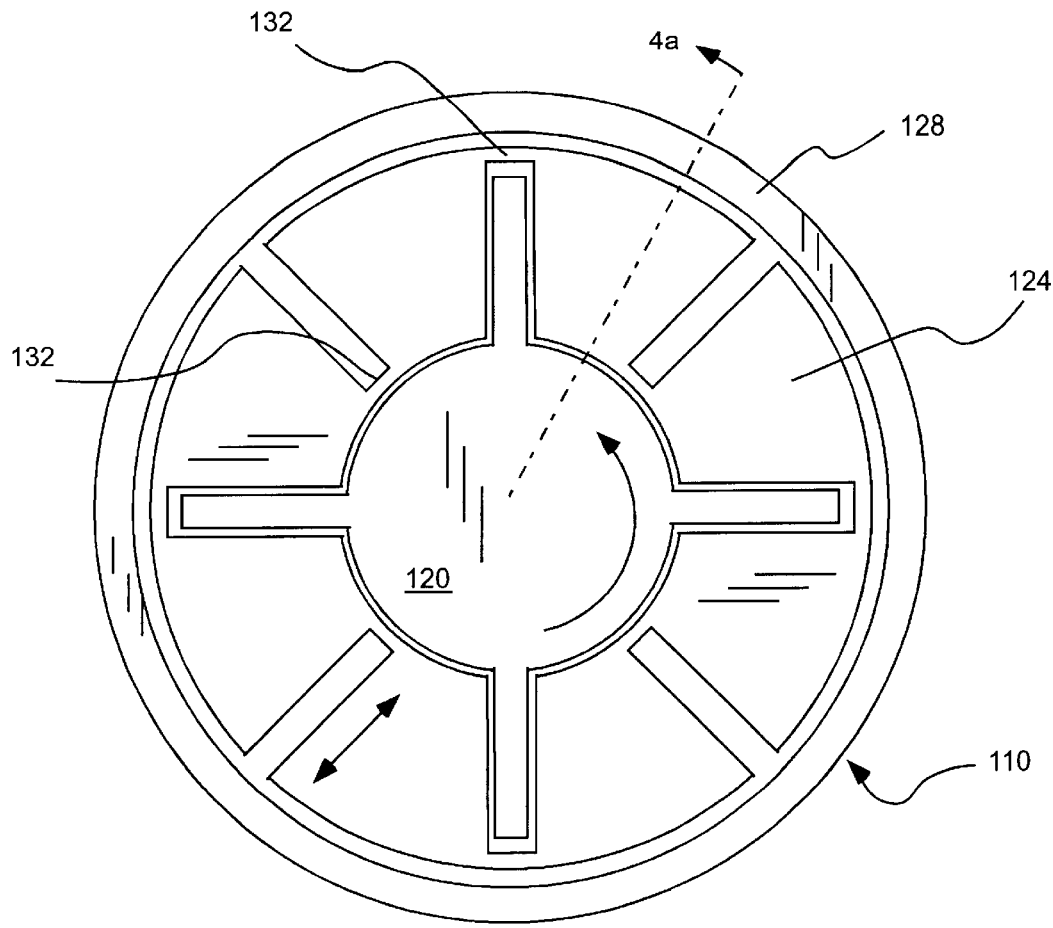
FIG. 3 is a front view of another compliant clutch in accordance with an embodiment of the present invention.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

As illustrated in the figures, various exemplary compliant mechanisms are shown which are formed of a plurality of thinner layers stacked together in accordance with the present invention. Such compliant mechanisms can include, for example, compliant clutches, compliant switches, compliant derailleurs, compliant brakes, etc. Such compliant mechanisms transfer or transform motion, force, or energy, and gain at least some of their mobility from the deflection of flexible members, rather than from movable joints only. Since these compliant mechanisms rely on the deflection of flexible members, energy is stored in the form of strain energy in the flexible members. These compliant mechanisms can be described as mechanisms where elastic deformation is intended as a source of motion. These compliant mechanisms include at least one relatively flexible section integrally formed with at least one relatively rigid section. The rigid and flexible sections are of integral construction, and provide an integral device capable of achieving motion by elastic deformation. The flexible section is deflectable and stores energy in the form of strain energy when deflected. Thus, the layers are in the same plane as the primary movement of the mechanism.

The rigid and flexible sections advantageously include a plurality of common layers stacked together. The compliant mechanism, or the rigid and flexible sections, can have a thickness and a profile shape that is substantially constant through the thickness, or in a third dimension. Each of the plurality of layers is thinner than the thickness of the compliant mechanism, so that the plurality of common layers is stacked together to achieve a desired thickness of the compliant mechanism. The individual layers themselves may be too thin, and thus useless, unless several layers are stacked together to form a greater thickness. The flexible section is bendable or deflectable in a plane parallel with the layers. Similarly, the rigid section can be movable within a plane parallel with the layers.

As stated above, difficulties have been experienced in fabricating such compliant mechanisms, particularly with respect to achieving tolerances in a cost efficient or high volume manner. It has been found, however, that the required tolerances can be achieved in thinner layers, and that the thinner layers can be combined to form the compliant mechanism with the desired thickness. It also has been found that the thinner layers can be fabricated in a cost efficient and higher volume manner, as discussed in greater detail below.

Referring to FIGS. 1–2b, a compliant overrunning clutch with centrifugal throw-out, indicated generally at 10, is shown with a plurality of layers 8 in accordance with the present invention. Such a compliant clutch 10 is described and illustrated in U.S. Pat. No. 6,148,979, which is herein incorporated by reference. The compliant clutch 10 includes a ratchet wheel 14 (FIG. 2b) concentrically disposed within a pawl wheel 12. The ratchet wheel 14 includes a plurality of angled ratchet teeth 16, each with a cam surface 18 and an opposite engaging surface 20.

The pawl wheel 12 includes a plurality of elongated resilient biasing members or flexible arms 30, and a plurality of pawls 40 attached thereto. The biasing members 30 secure the pawls 40 to the pawl wheel, and bias the pawls 40 into engagement. The pawl wheel 12 is configured to rotate in a first engaging direction (counter-clockwise in FIG. 2b), and in a second overrun direction. The pawls 40 include pawl teeth 42 that engage the ratchet teeth 16 of the ratchet wheel 14 when the pawl wheel 12 rotates in an engaging direction. In addition, the pawls 40 are pushed outwardly over the ratchet teeth 16 by the cam surface 18 when the pawl wheel 12 rotates in an overrun direction. The resilient biasing members 30 bias the pawls 40 toward the engaging position, and allow resiliently biased rotation of the pawl between an engaging position and a free-wheeling position. The ratio between the output torque of the clutch and the overrun torque (the torque required to remove the pawls from engagement) is maximized to provide a throw-out feature whereby the pawls will rotate away from the ratchet wheel due to centrifugal force when the pawl wheel rotates in the overrun direction. When the clutch reaches a specified angular velocity, the centrifugal force on the pawls 40 overcomes the biasing force of the resilient arms 30, causing the pawls to rotate outwardly such that they no longer engage the ratchet teeth 16 or contact the cam surface 18 of any of the teeth. When the angular velocity decreases, the resilient arms 30 overcome the centrifugal force and return the pawls to their engaging position.

The entire pawl wheel 12 can be a one-piece pawl wheel formed as a compliant mechanism attached to a pawl wheel, or the pawl 40 and biasing member 30 can be one piece formed as a compliant mechanism attached to a pawl wheel. Thus, the plurality of pawls 40 and the plurality of elongated resilient biasing members 30 can be integrally fabricated as a single, compliant part. The pawls 40 and/or the pawl wheel 12 are relatively rigid and relatively wider, while the biasing members or resilient arms 30 are relatively flexible and relatively narrower. The narrow width and shape of the resilient arms 30 is designed for controlled deformation.

As stated above, the entire pawl wheel 12, or at least the resilient arms 30 and corresponding pawls 40, can be formed by the plurality of common layers 8 stacked together. Each of the plurality of layers 8 can have a thickness less than the desired thickness of the entire pawl wheel 12 or compliant mechanism. It will be appreciated that the width of the biasing members or resilient arms 30 are important to the performance of the clutch 10. For example, a wider arm will be more rigid, while a narrower arm will be more flexible. Thus, a variation in the desired or required width of the arms 30 will affect the operation of the clutch. Therefore, it will be appreciated that it is critical for the actual arms 30 to be manufactured to the specified tolerances. It has been found that it is possible to achieve the desired tolerances of the pawl wheel 12 in a cost effective and/or higher volume manner in thinner layers, as described below. Thus, the thinner layers 8 with the desired tolerances are stacked together to form the pawl wheel 12.

It will be appreciated that the number of layers 8 determines the biasing force of the resilient arms 30, or the centrifugal force and rotational velocity required to disengage the pawls 40 and pawl wheel 12 from the ratchet wheel 14. Thus, the number of layers 8 can be varied to achieve the desired force or velocity characteristics. It will be appreciated that the width of the resilient arms 30 can be varied to achieve the desired force requirement, but may require several different pawl wheels 12 for different applications. Therefore, varying the number of layers 8 is a simple way to adjust the performance characteristics of the clutch 10.

The plurality of layers 8 can be attached or joined together. For example, apertures 48 can be formed in each of the layers 8 to receive fasteners, such as screws, bolts, rivets, etc. The layers can be fastened together in various manners, as described below.

Figure 4B:
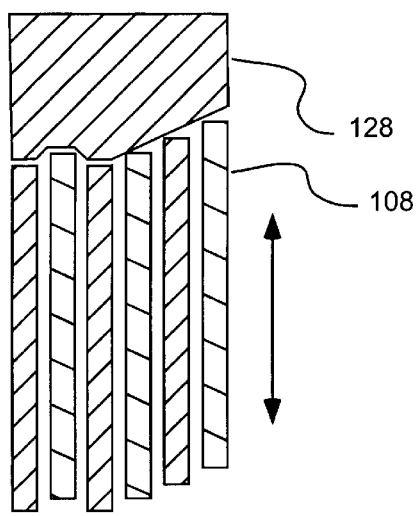
FIG. 4b is a detailed cross-sectional side view of the compliant clutch of FIG. 3.
Figure 4A:
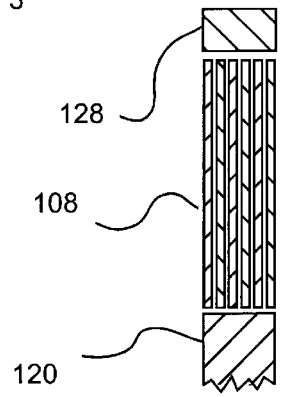
FIG. 4a is a cross-sectional side view of the compliant clutch of FIG. 3.

Referring to FIGS. 3–4b, a compliant floating-opposing-arm (FOA) centrifugal clutch, indicated generally at 110, is shown with a plurality of layers 108 in accordance with the present invention. Such a clutch 110 is described and illustrated in U.S. Provisional Patent Application No. 60/185,258, filed Feb. 28, 2000, and PCT Application No. PCT/US01/06308, filed Feb. 28, 2001, which are herein incorporated by reference. Torque is transmitted from a central drive hub 120 through floating clutch shoes 124 to an outer drum 128. The floating clutch shoes 124 include aggressively oriented or self-energizing shoes, and non-aggressively oriented or de-energizing shoes, connected together by biasing arms 132. The biasing arms 132 bias the shoes 124 toward a disengaged position. When the central drive hub 120 and clutch shoes 124 reach a specified angular velocity, the centrifugal force on the shoes 124 overcomes the biasing force of the biasing arms 132, causing the shoes 124 to rotate outwardly and engage the drum 128. When the angular velocity decreases, the biasing arms 132 overcome the centrifugal force and return the shoes 124 to their disengaged position.

The floating clutch shoes 124 can be formed as a one-piece clutch shoe or compliant mechanism. Thus, the plurality of shoes 124 and the plurality of biasing arms 132 can be integrally fabricated as a single, compliant part. The shoes 124 are relatively rigid and relatively wider, while the biasing arms 132 are relatively flexible and relatively narrower. Again, the biasing arms 132 are designed for controlled deformation.

As stated above, the clutch shoes 124 can be formed by the plurality of common layers 108 stacked together. Each of the plurality of layers 108 can have a thickness less than the desired thickness of the clutch shoe 124. It has been found that it is possible to achieve the desired tolerances of the clutch shoe 124 in a cost effective and/or higher volume manner in thinner layers, as described below. Thus, the thinner layers 108 with the desired tolerances are stacked together to form the clutch shoe 124.

Unlike the pawl wheel 12 of the clutch 10 shown in FIGS. 1–2b, the layers 108 forming the clutch shoe 124 of the clutch 110 shown in FIGS. 3–4b need not be attached together, or wholly attached together. The layers 108 of the clutch shoe 124 can move and deflect independently of one another. Thus, one layer 108 of the clutch shoe 124 can expand radially outwardly to a greater or lesser degree than another layer. Referring to FIG. 4b, the independent movement of the layers 108 of the clutch shoe 124 can compensate for inconsistencies or lack of tolerance in an engagement surface of the drum 128. Therefore, the plurality of layers 108 not only helps achieve the desired tolerance for the clutch shoe 124, but can make up for variations in the engagement surface and the drum 128. The layers 108 of the clutch shoe 124 can be wholly or partially unattached, and thus independently movable with respect to adjacent layers, or free portions thereof.

Referring to FIGS. 5–6b, an s-clutch, indicated generally at 210, is shown with a plurality of layers 208 in accordance with the present invention. The s-clutch 210 includes one or more lobes or shoes 214 attached to a center portion 218 by one or more biasing arms 222. The operation of the s-clutch is similar in many respects to the operation of the FOA clutch 110 shown in FIGS. 3–4b. The lobes or shoes 214 engage a drum 226 at a certain rotational velocity.

The s-clutch 210 can be a one-piece clutch formed as a compliant mechanism. The lobes or shoes 214 and the biasing arms 222 can be integrally formed. The lobes or shoes 214 can be relatively wider and relatively rigid, while the biasing arms 222 can be relatively narrow and relatively flexible. Again, the biasing arms 222 are designed for controlled deformation.

The layers 208 of the s-clutch 210 can include attached portions 230 and free portions 234. The attached portion 230 of the layers 208 can correspond to the center portion 218 of the s-clutch 210, while the free portions 234 of the layers 208 can correspond to the lobes or shoes 214. Thus, the free portions 234 of the layers or shoes 214 are unattached to adjacent free portions or shoes, and independently movable with respect to adjacent free portions or shoes. Again, the independent movement of the shoes 214 can compensate for lack of tolerance in the engagement surface of the drum 226.

Figure 7:
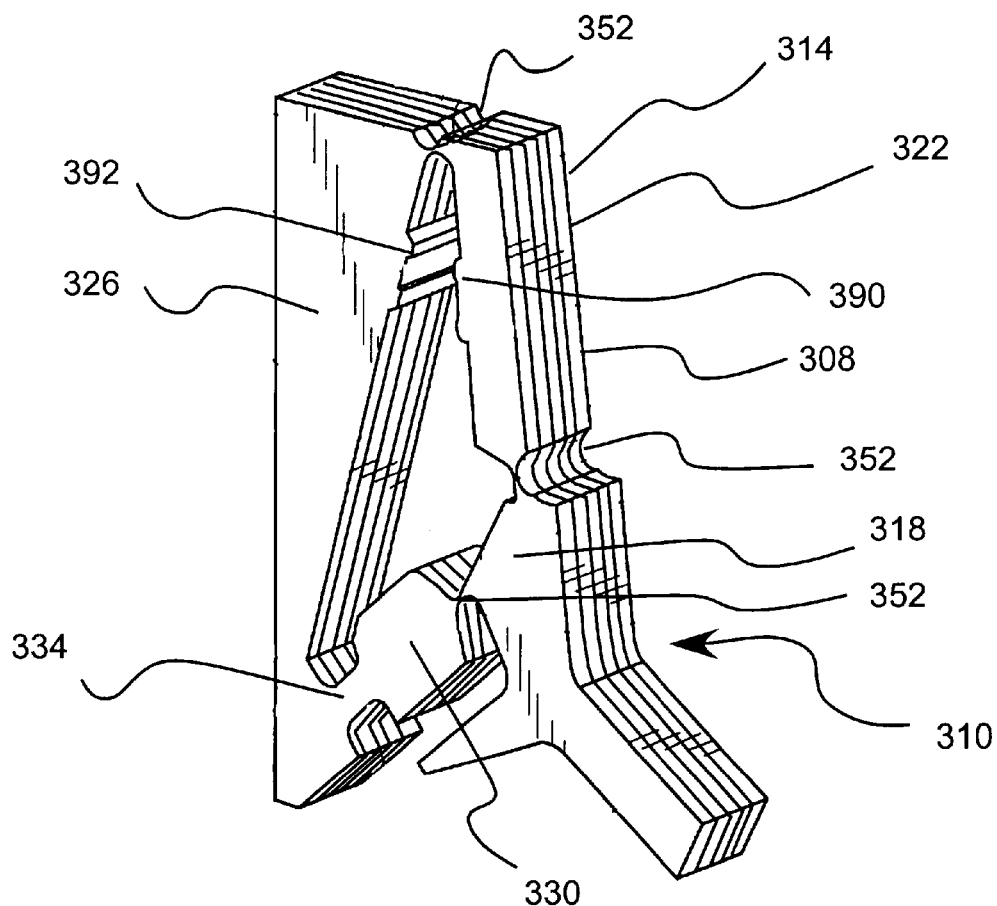
FIG. 7 is a perspective view of a compliant switch in accordance with an embodiment of the present invention shown in a first position.
Figure 8:
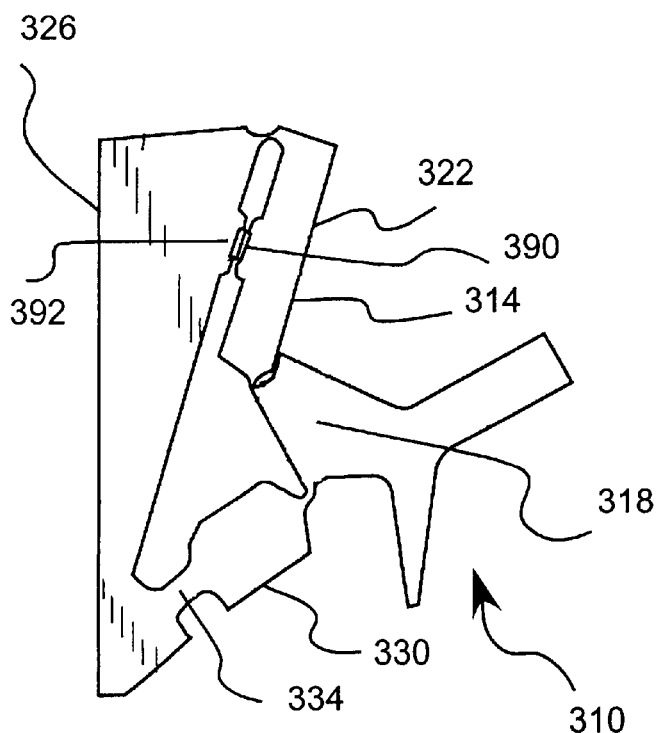
FIG. 8 is a side view of the compliant switch of FIG. 7, shown in a second position.

Referring to FIGS. 7 and 8, a compliant switch, indicated generally at 310, is shown with a plurality of layers 308 in accordance with the present invention. Such a compliant switch is described and illustrated in U.S. Pat. No. 6,215,081, which is herein incorporated by reference. The compliant switch 310 is a compliant, bistable mechanism having a plurality of segments 314 coupled end-to-end in series to form a continuous chain of segments. The plurality of segments includes at least two relatively rigid segments 318, 322, 326 and 330, and at least one relatively flexible and resilient segment 334. Adjacent rigid segments are coupled by either flexible joints 352 or pin joints. The relatively flexible and resilient segment 334 is coupled to adjacent segments either fixedly or by pin joints. The sum of the pin joints, the flexible joints and/or the relatively flexible and resilient segments is at least four.

The relatively flexible and resilient segment 334 operates to resist relative movement of the segments, but allows the segments to be selectively moved. The plurality of segments 314 are biased by the at least one relatively flexible and resilient segment 334. The plurality of segments 314 are cooperatively movable relative to one another between (i) a first, stable, static, equilibrium position, and (ii) a second, stable, static, equilibrium position. The first position (shown in FIG. 7) is a low-energy position in which the at least one relatively flexible and resilient member 334 is substantially undeflected, and stores substantially no energy, or low energy relative to surrounding positions. The second position (shown in FIG. 8) is a force loaded position in which the at least one relatively flexible and resilient segment 334 is deflected, and stores energy such that the mechanism exerts a force in the second position. Alternatively, the at least one relatively flexible and resilient segment may be deflected in one or both of the first and second positions. In addition, both first and second positions may be low-energy positions in which the relatively flexible and resilient segment is undeflected.

The at least two relatively rigid segments are coupled by, and formed integrally with, a substantially flexible joint. In addition, all of the plurality of segments may be integrally formed from a single piece of material. The single piece of material has cross sectional dimensions of (i) relatively wide portions, (ii) relatively narrow portions, and (iii) at least one portion with an intermediate width. The relatively rigid segments are formed of the relatively wide portions, and thus are generally rigid. The substantially flexible segments are formed of the relatively narrow portions, and thus are generally compliant. The relatively flexible and resilient segment is formed of the portion of intermediate width, and thus is both flexible and resilient.

The switch mechanism 310 preferably includes four relatively rigid segments 318, 322, 326 and 330 coupled end-to-end in series by three substantially flexible joints 352, or pivot joints, and one relatively flexible and resilient segment 334. The relatively flexible and resilient segment 334 can be fixedly coupled to adjacent rigid segments. Two electrical contacts can be coupled to the plurality of segments, including first and second electrical contacts 390 and 392. The first electrical contact 390 is movable with one of the segments between (i) a first location, and (ii) a second location. In the first location (shown in FIG. 8), the first electrical contact 390 contacts the second electrical contact 392, and defines an on position. In the second location (shown in FIG. 7), the first electrical contact 390 is in a non-contacting relationship with the second electrical contact 392, and defines an off position.

The design of the flexible and resilient segment 334 should take into account the combination of the cross-section, including the layer thickness and number of layers, and the length of the segment. Deflection will depend on the segment thickness and the segment length. In addition, there is a trade-off between thickness and length. Namely, the same deflection may be achieved by a segment that is thicker and longer, or one that is thinner and shorter.

The compliant switch 310 can be formed by a plurality of common layers 308 stacked together. Each of the plurality of layers 308 can have a thickness less than the desired thickness of the compliant switch 310. The thinner layers 308 are stacked together to form the switch 310. It will be appreciated that the number of layers 308 determines the force required to operate the switch, or move it between first and second positions. Thus, the number of layers 308 can be varied to achieve the desired force requirement characteristics. It will be appreciated that the width of the flexible and resilient segment can be varied to achieve the desired force requirement, but that varying the width may be impractical during manufacturing (e.g. by varying the mold or die). Therefore, varying the number of layers 308 is a simple way to adjust the force requirements of the switch 310.

The plurality of layers 308 can be attached or joined together in various manners, as described below.

It will be appreciated that the compliant switch 310 is one example of a number of different compliant mechanisms Other examples of compliant mechanisms include compliant derailleurs and compliant brakes. A compliant derailleur is described in U.S. patent application Ser. No. 09/496,555 which is now issued U.S. Pat. No. 6,354,971 which is herein incorporated by reference. A compliant brake, is described in U.S. Provisional Patent Application No. 60/098,586, filed Aug. 31, 1998, and PCT application No. PCT/US99/19057, filed Aug. 18, 1999, which are herein incorporated by reference.

A method for making a compliant mechanism as described above includes selecting a desired profile of the compliant mechanism having a continuous integral shape. The shape includes a wider portion forming the relatively rigid section, and a relatively thinner portion, integral with the wider portion, forming the relatively flexible section. A plurality of layers of the desired profile of the compliant mechanism are cut from a sheet of material having a thickness less than a desired thickness of the compliant mechanism. The plurality of layers can be cut by a stamping, or a fine blanking, process. It has been found that desired tolerances can be achieved by stamping thinner layers of material that are thinner than the desired thickness of the compliant mechanism. In addition, the cutting may be accomplished by other cutting methods, including for example, laser cutting, etc.

Figure 9:
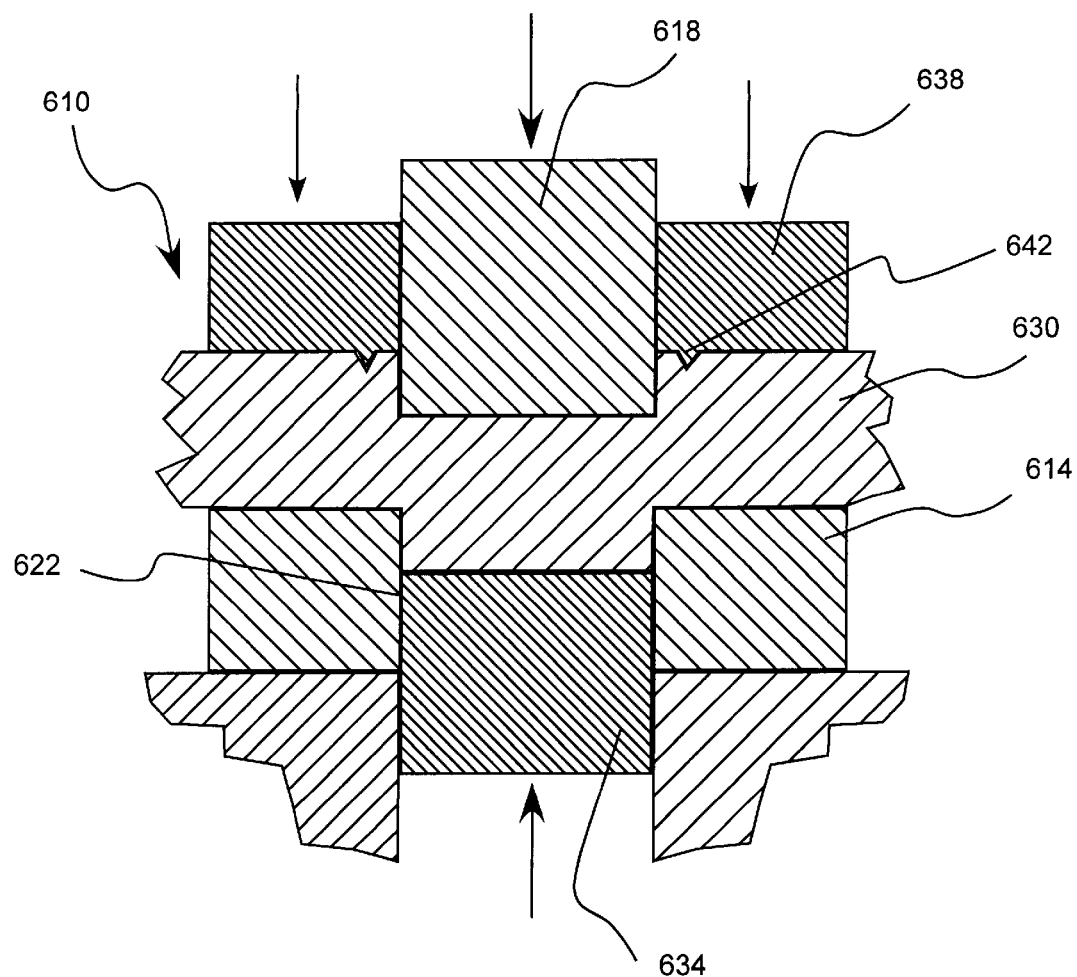
FIG. 9 is a schematic view of a blanking process for forming compliant mechanisms.

Referring to FIG. 9, the blanking process 610 can include a blanking die 614 and a blanking punch 618. The blanking die 614 includes an aperture 622 sized and shaped to produce the desired shape or profile. Similarly, the blanking punch 618 includes a protrusion sized and shaped to mate or match with the aperture 622 in the blanking die 614. The blanking punch 618 is movably received within the aperture 622 of the blanking die 614. A layer of material 630 placed between the blanking punch 618 and the blanking die 614 is cut when the punch 618 is inserted into the aperture 622 of the die 614. A lower pressure cushion 634 is movably disposed in the aperture 622 of the die 614 and exerts pressure on the layer of material 630. Similarly, an upper pressure pad 638 is movably disposed about the punch 618 and exerts pressure on the layer of material 630. The cushion 634 and the pad 638 move as the layer of material 630 extends into the aperture 622 and around the punch 618.

In addition, a "fine" blanking process can be used that includes a ring groove 642 surrounding the die to hold the sheet of material in place while the die punches through with straight edges.

Examples of fine blanking speeds are show in Table 1 below.

TABLE 1

| Workpiece Thickness (in.) | Approximate number of cycles per minute | | |
|---|---|---|---|
| | Workpiece material | | |
| | Mild steel | Aluminum | Stainless steel |
| 0.05 | 480 | 560 | 320 |
| 0.10 | 240 | 280 | 160 |
| 0.20 | 120 | 140 | 80 |
| 0.40 | 60 | 70 | 40 |
| 0.80 | 30 | 35 | 20 |

The plurality of layers are stacked adjacent one another to form the desired thickness of the mechanism. The individual layers by themselves may be too thin, and thus useless, unless several layers are stacked together to form a greater thickness. As described above, the plurality of layers can be stacked without substantially attaching adjacent free portions of the layers together. Thus, the free portions are independently movable with respect to one another.

Alternatively, the layers can be attached together by various different joining processes including mechanical joining, thermal joining, and/or chemical joining. Mechanical joining includes screws/bolts/rivets disposed through apertures that can be formed by drilling, amtack, and staking. Thermal joining includes welding and brazing or soldering. Chemical joining includes adhesives. The type of joining used can affect the material properties, and thus the functionality of the compliant mechanism. The type of joining used also can affect the assembly time, part count, assembly complexity, and process speed.

The compliant mechanisms or the plurality of layers can be formed of numerous different materials. For example, for clutch applications, the material can be metal. The present invention has been found to be particularly useful for compliant mechanisms formed of metal, and other materials that have a high modulus of elasticity. Other materials, such as plastics, can be used as well.

In addition, the different materials can have different properties. For example, different layers can be formed of different materials.

It is to be understood that the above-referenced arrangements are only illustrative of the application for the principles of the present invention. Numerous modifications and alternative arrangements can be devised without departing from the spirit and scope of the present invention. While the present invention has been shown in the drawings and fully described above with particularity and detail in connection with what is presently deemed to be the most practical and preferred embodiments(s) of the invention, it will be apparent to those of ordinary skill in the art that numerous modifications can be made without departing from the principles and concepts of the invention as set forth in the claims.

What is claimed is:

1. A method for making a compliant mechanism capable of achieving motion by elastic deformation, comprising the steps of:

a) selecting a desired profile of the compliant mechanism having a continuous integral shape with a wider portion forming a relatively rigid section, and a relatively thinner portion, integral with the wider portion, forming a relatively flexible section, the rigid and flexible sections achieving motion by elastic deformation of the flexible section and storing strain energy in the flexible section;

b) cutting a plurality of layers of the desired profile of the compliant mechanism from a sheet of material having a thickness less than a desired thickness of the compliant mechanism; and c) stacking the plurality of layers adjacent one another to form the desired thickness of the compliant mechanism without attaching the layers together so that the relatively flexible sections of the layers can elastically deflect independently of one another and so that the relatively rigid sections of the layers can move independently of one another.

2. A method in accordance with claim 1, wherein the step of stacking further includes stacking the plurality of layers without substantially attaching adjacent free portions of the layers together so that the free portions are independently movable with respect to one another.

3. A method in accordance with claim 1, wherein the step of cutting further includes stamping.

4. A method in accordance with claim 1, wherein the step of selecting a desired profile of the compliant mechanism further includes selecting a desired profile having a continuous integral shape with a free portion; and wherein the step of stacking the plurality of layers further includes stacking the plurality of layers adjacent one another without attaching the free portions together so that the free portions can deflect independently of one another.

5. A method in accordance with claim 1, wherein the step of selecting a desired profile of the compliant mechanism further includes selecting a profile of a floating-opposing-arm centrifugal clutch including floating clutch shoes connected together by biasing arms.

6. A method in accordance with claim 1, wherein the relatively flexible section is deflectable and stores energy in the form of strain energy when deflected.

7. A method in accordance with claim 1, wherein the relatively flexible section is deflectable wholly within a plane that is parallel with the plurality of layers.

8. A method in accordance with claim 1, wherein the relatively rigid section is movable within a plane that is parallel with the plurality of layers.

9. A method for making a compliant mechanism capable of achieving motion by elastic deformation, comprising the steps of:

a) selecting a desired profile of the compliant mechanism having a continuous integral shape with a wider portion forming a relatively rigid section, a relatively thinner portion, integral with the wider portion, forming a relatively flexible section, and a free portion the rigid and flexible sections achieving motion by elastic deformation of the flexible section and storing strain energy in the flexible section;

b) cutting a plurality of layers of the desired profile of the compliant mechanism from a sheet of material having a thickness less than a desired thickness of the compliant mechanism; and c) stacking the plurality of layers adjacent one another to form the desired thickness of the compliant mechanism without attaching the free portions together so that the relatively flexible sections of the layers can elastically deflect independently of one another and so that the free portions can move independently of one another.

10. A method in accordance with claim 9, wherein the step of selecting a desired profile of the compliant mechanism further includes selecting a profile of a floating-opposing-arm centrifugal clutch including floating clutch shoes connected together by biasing arms.

11. A method in accordance with claim 9, wherein the relatively flexible section is deflectable and stores energy in the form of strain energy when deflected.

12. A method in accordance with claim 9, wherein the relatively flexible section is deflectable wholly within a plane that is parallel with the plurality of layers.

13. A method in accordance with claim 9, wherein the relatively rigid section is movable within a plane that is parallel with the plurality of layers.

14. A method in accordance with claim 9, wherein the plurality of layers each include a free portion; and wherein the free portions of the plurality of layers are substantially unattached to free portions of adjacent layers such that the free portions of the plurality of layers are independently movable with respect to one another.

15. A method in accordance with claim 9, wherein the step of selecting a desired profile of the compliant mechanism further includes selecting a profile of pawl wheel with at least one pawl coupled to the pawl wheel and formed by the rigid section, and at least one biasing member coupling the at least one pawl to the pawl wheel and formed by the flexible section.

* * * * *